Figure 1:
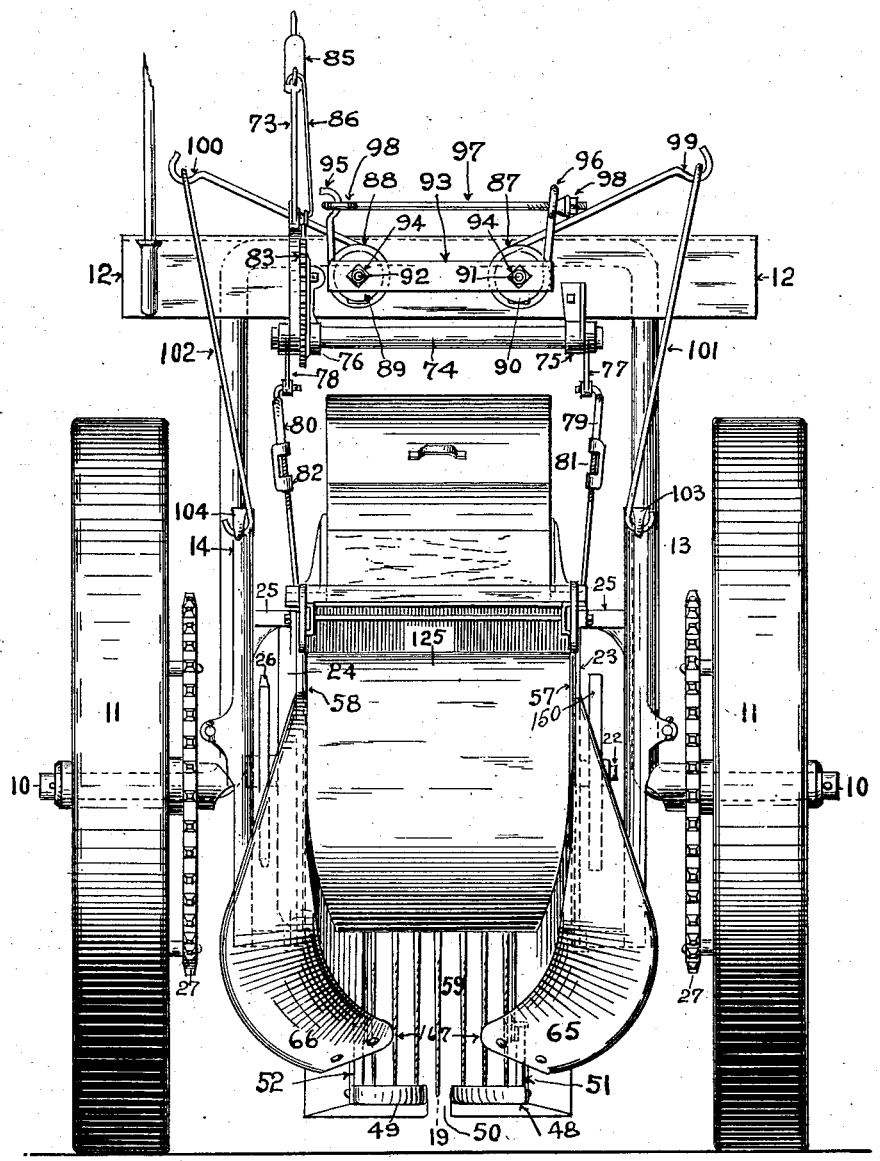

H. E. BULLOCK & R. C. SCHERLING.
COTTON HARVESTER.
APPLICATION FILED DEC. 30, 1908.

1,009,381.

Patented Nov. 21, 1911.
8 SHEETS—SHEET 1.

Witnesses:
E. B. Knudsen
A. H. Peterson.

Inventors:
Henry E. Bullock,
Rudolph C. Scherling,
By Michael J. Stark & Sons
Attorneys.

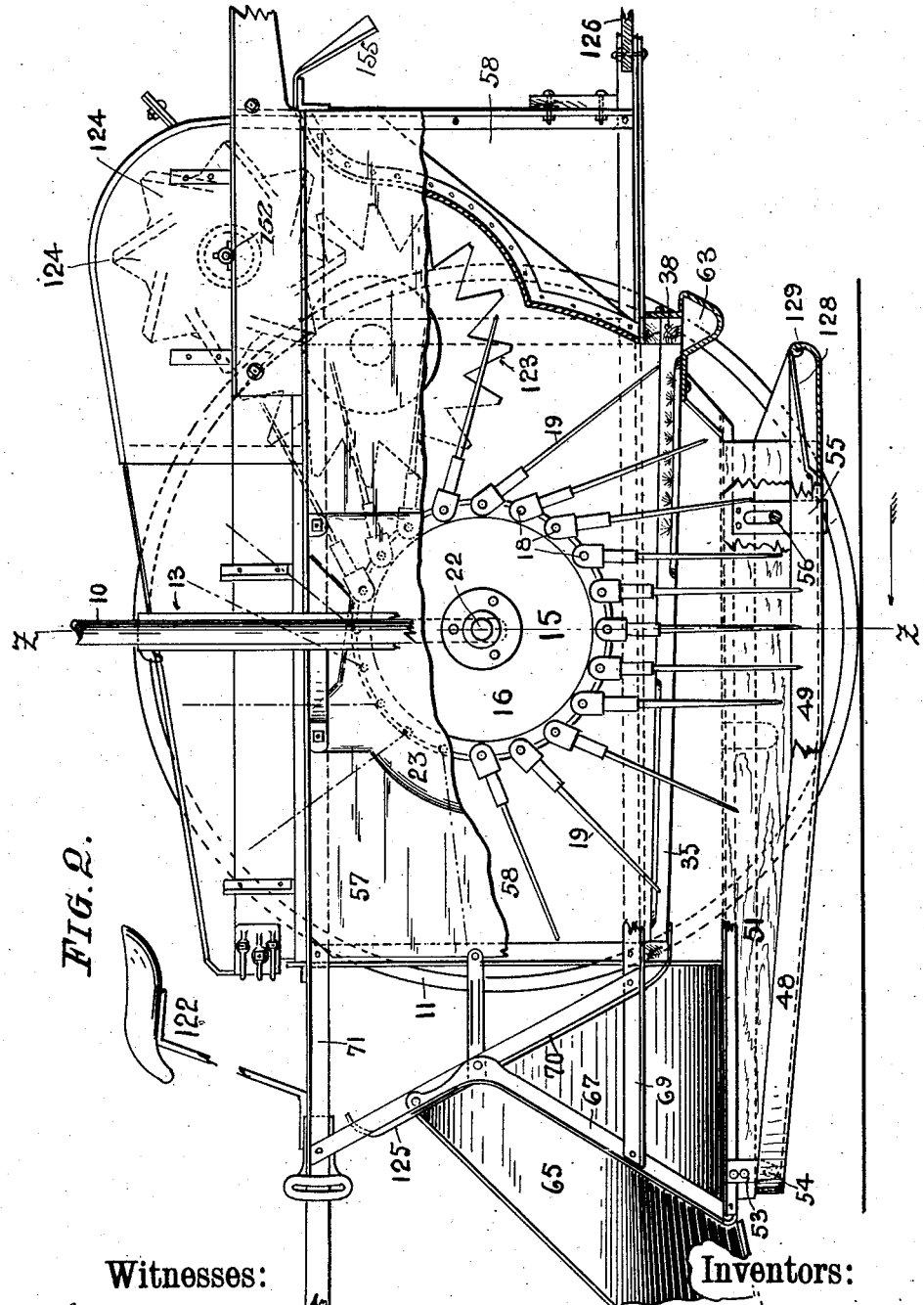

H. E. BULLOCK & R. C. SCHERLING.
COTTON HARVESTER.
APPLICATION FILED DEC. 30, 1908.
1,009,381.
Patented Nov. 21, 1911.
8 SHEETS—SHEET 3.
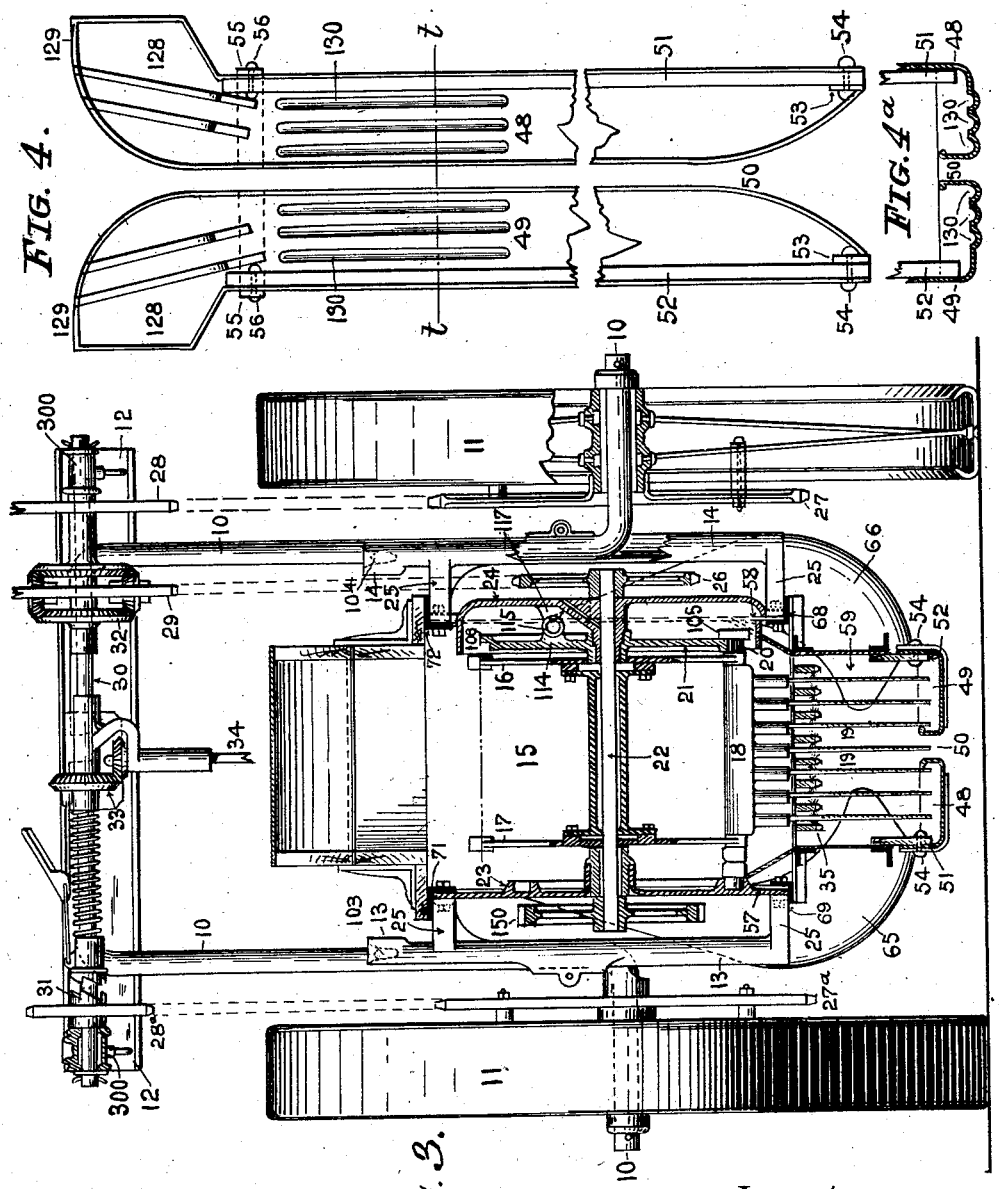

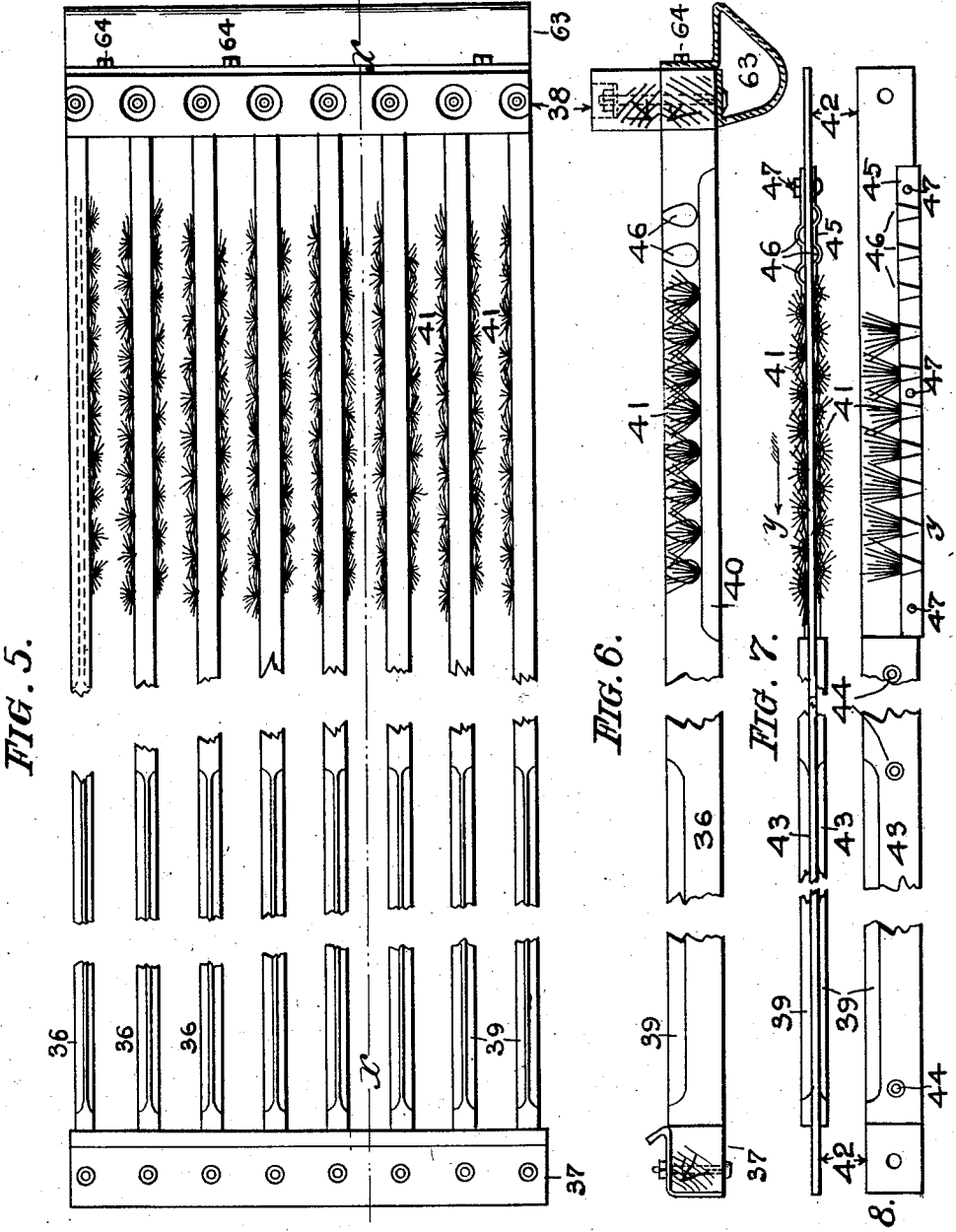

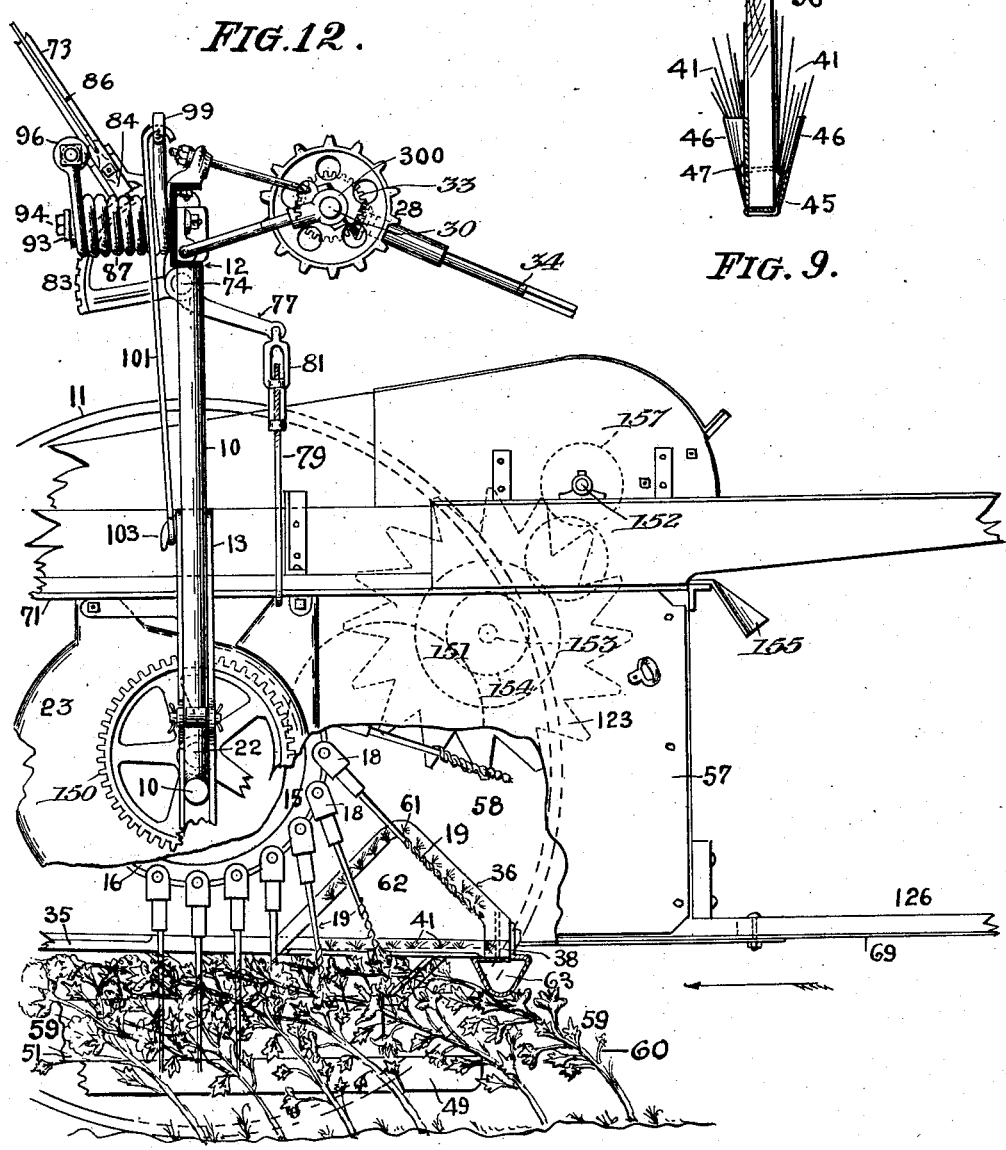

H. E. BULLOCK & R. C. SCHERLING.
COTTON HARVESTER.
APPLICATION FILED DEC. 30, 1908.
1,009,381.
Patented Nov. 21, 1911.
8 SHEETS—SHEET 6.
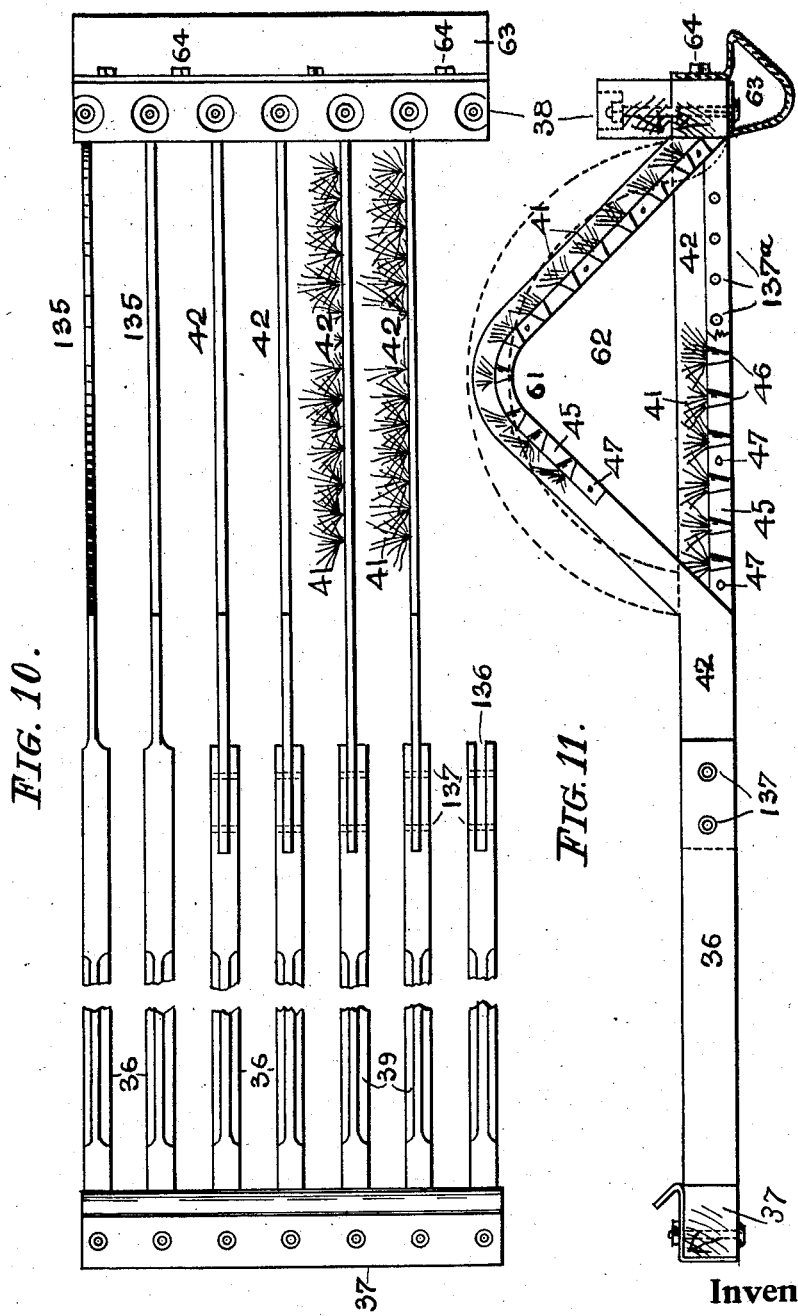
Witnesses:
C. B. Knudsen
A. G. Peterson
Inventors:
Henry E. Bullock,
Rudolph C. Scherling,
By Michael J. Stark & Sons,
Attorneys.

H. E. BULLOCK & R. C. SCHERLING.
COTTON HARVESTER.
APPLICATION FILED DEC. 30, 1908.
1,009,381.
Patented Nov. 21, 1911.
8 SHEETS—SHEET 7.
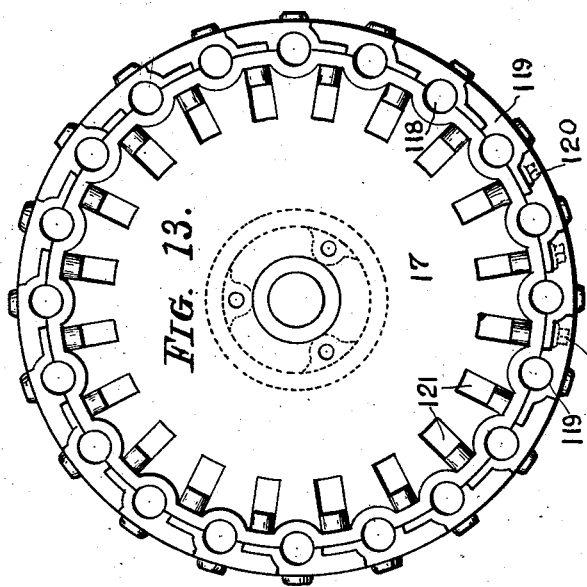
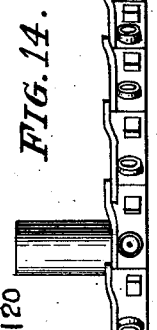
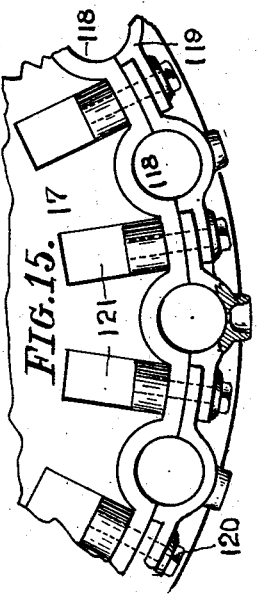
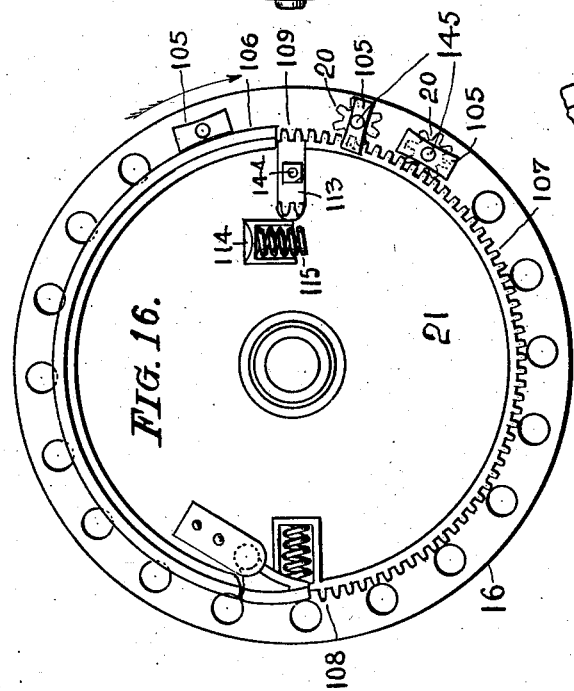
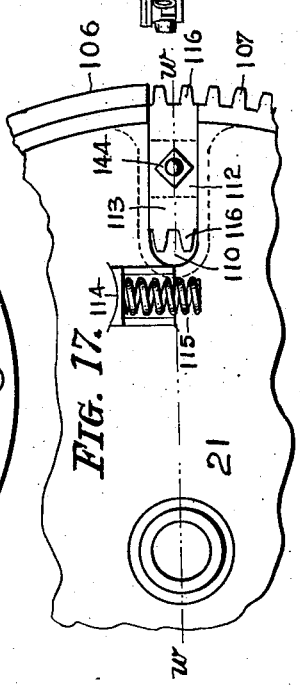
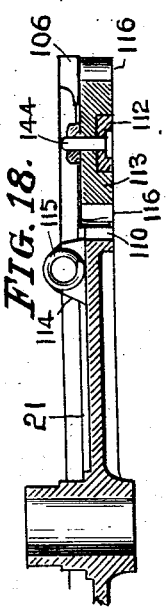
Witnesses:
E. B. Knudsen
A. B. Peterson
Inventors:
Henry E. Bullock,
Rudolph C. Scherling,
By Michael J. Stark & Sons
Attorneys.

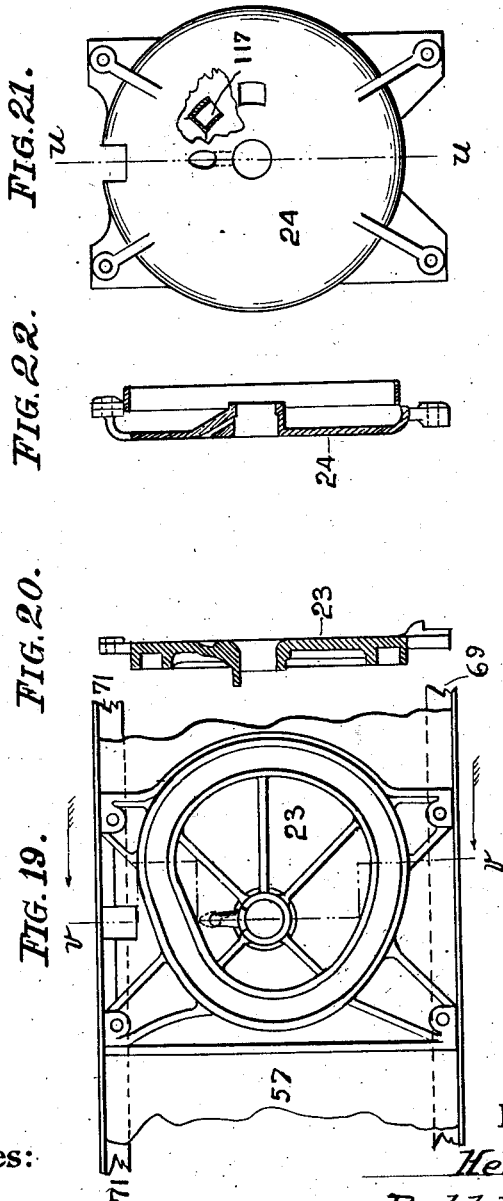

UNITED STATES PATENT OFFICE.

HENRY E. BULLOCK AND RUDOLPH C. SCHERLING, OF CHICAGO, ILLINOIS, ASSIGNORS TO HENRY E. BULLOCK AND JAMES E. BULLOCK, OF CHICAGO, ILLINOIS.

COTTON-HARVESTER.

1,009,381.  Specification of Letters Patent.  Patented Nov. 21, 1911.

Application filed December 30, 1908. Serial No. 469,925.

*To all whom it may concern:*

Be it known that we, HENRY E. BULLOCK, a subject of Great Britain, and RUDOLPH C. SCHERLING, a citizen of the United States, both residents of Chicago, in the county of Cook and State of Illinois, have jointly invented certain new and useful Improvements in Cotton-Harvesters; and we do hereby declare that the following description of our said invention, taken in connection with the accompanying sheets of drawings, forms a full, clear, and exact specification, which will enable others skilled in the art to which it appertains to make and use the same.

This invention has general reference to improvements in cotton harvesters; and it consists, essentially, in the novel and peculiar combination of parts and details of construction as hereinafter first fully set forth and described and then pointed out in the claims.

In the drawings already referred to, and which serve to illustrate this invention more fully, Figure 1 is a front-elevation of our improved cotton harvester. Fig. 2 is a side-elevation of the same, one of the traction-wheels being removed and the side-plate of the machine broken away to disclose details of construction. Fig. 3 is a transverse-sectional elevation on line $z\ z$ of Fig. 2, looking toward the forward end of the machine, as indicated by an arrow on Fig. 2, only one column of picking spindles being shown. Fig. 4 is a plan of the guard detached, and Fig. 4$^a$ a transverse section of the same on line $t\ t$ in Fig. 4. Fig. 5 is a plan of the grate detached, and Fig. 6 a sectional view of the same on line $x\ x$ of Fig 5. Fig. 7 is a plan of one of the grate-bars, and Fig. 8 a side-view of the same, these two figures illustrating modified constructions of the grate-bars. Fig. 9 is a transverse section of one of the grate-bars detached, and illustrating the means for attaching the brushes to said bars. Fig. 10 is a plan of a grate, and Fig. 11 a side-elevation of the same showing further modifications of the grate-bars. Fig. 12 is a side-elevation of the harvester illustrating the rear-portion of the machine, the figure being mutilated to show the operating mechanism in the act of picking cotton. Fig. 13 is a plan of one of the cylinder-heads detached. Fig. 14 is an edge-view of the same, and Fig. 15 an inverted plan of a fragment of the cylinder-head. Fig. 16 is a plan of the delay-gear and the cylinder-head beneath the same. Fig 17 is a plan of a fragment of the delay-gear drawn on a larger scale, and Fig. 18 a sectional view on line $w\ w$ of Fig. 17. Fig. 19 is a plan of the cam-disk, and Fig. 20 a sectional view of the same on line $v\ v$ of Fig. 19. Fig. 21 is a plan of the guard for the delay-gear, and Fig. 22 a sectional view of the same on line $u\ u$ of Fig. 21.

Like parts are designated by corresponding symbols of reference in all the various figures.

The object of this invention is the improvement of various parts and details of construction of a cotton harvester having intermittently-revolving picker stems, which actual trials of the machine in the field have demonstrated to be necessary to make the machine more serviceable, more certain in its operation, and less liable to derangement and the breakage of parts, and more specially with a view of preventing the scattering of the cotton.

To attain these objects we construct this cotton harvester as shown in the drawings, in which the reference-symbol 10 designates the axles, and 11 the traction-wheels. These axles are of substantially Z-shape and they are secured with their upper members to a bridge-piece 12, Figs. 1, 3, and 12, and they carry, by means of side-irons 13 and 14, the entire mechanism of the machine in a manner hereinafter to be described.

15 designates the cylinder which comprises two heads or disks 16 and 17, within which are mounted a series of columns 18, each of which carries a series of intermittently-revolving picker-spindles 19, which are actuated by pinions 20 engaging a delay-gear 21, as will hereinafter more fully appear. This delay-gear with the cylinder-heads are mounted upon a shaft 22, which has its bearings on one end in a cam-plate 23, and on the opposite end in a guard-plate 24, both plates being properly secured to the side-plates 57 and 58 of the machine together with the side-irons 13 and 14, by brackets 25. The shaft 22 is rotated by a sprocket-wheel 26 on said shaft 22 receiving its motion from sprocket-wheels 27 and 27$^a$ on the traction-wheels 11, and sprocket-wheels 28 and 28ᵃ and 29 on a counter-shaft 30, which counter-shaft 30 has its bearings in journals 30ᵒ secured to the bridge-piece 12, all as clearly illustrated in Figs. 3 and 12. The sprocket-wheel 28ᵃ upon this counter-shaft is loosely placed thereon and it has a clutch 31 by means of which the counter-shaft 30 may be thrown into, and out of, action, the sprocket-wheel 29 being fitted with a differential gearing 32 of usual design so that either or both of the traction-wheels may operate the machine in the well-known manner. Upon the shaft 30 there is placed a bevel-gearing 33, having a rearwardly inclined shaft 34, which actuates a packer, not shown. This bevel-gearing is shown in Fig. 3 as being downwardly pending, but in reality it extends rearwardly and downwardly at an angle of approximately 45 degrees, as illustrated in Fig. 12.

35 designates the grate which is shown in detail in Figs. 5 to 11, its object being to depress and compress the cotton bushes into a confining-space 59 while the picking-spindles 19 are revolving and picking the cotton lint from the bolls of the plants 60. This grate consists of a series of bars 36 spaced a suitable distance apart to permit of the passage of the picking spindles 19 and these bars are secured to end-pieces 37 and 38. The forward part of these grate-bars are beveled at their upper edges as designated by the numeral 39, while the rear part thereof are beveled at their lower edges as indicated by the reference-symbol 40.

On the opposite sides of the grate-bars 36, and at the rear-portion thereof, there are placed a series of brushes 41, as shown in Figs. 5 to 9, which brushes are designed to intercept any loose cotton lint that may strip off the picking spindles 19 before they reach the stripper 123 and thereby prevent it from dropping back into the bushes; but since the introduction of these brushes when placed on both sides of the grate-bars may have a tendency to loosen the cotton lint from the fingers we may place the brushes 41 on only one side of the grate-bars, as illustrated in Fig. 10, the side selected being the one which, when the picking spindles are revolving in their proper direction around their own axis, would have a tendency to cause the lint to be still tighter wound upon the spindles when touched by the brushes. In constructing these bars we may produce them in wood, as shown in Figs. 5, 6, and 9, but we may also construct them as illustrated in Figs. 7, 10, and 11, that is to say, make the body of the bar from a metallic bar 42, and place for approximately one-half of their length, cheeks 43 on both sides thereof and bevel the upper edges of the wooden portion in the manner indicated with reference to the wooden bars, said cheeks being riveted or otherwise secured to said bars by means of rivets, screws or other suitable fastenings 44.

To the rear end of the bars 42 we secure metallic strips 45 substantially U-shaped in transverse section and having outwardly-formed projections 46 serving as pockets for the reception of the brushes 41, said strips being removably secured to the bars 42 by suitable fastenings 47, so that should the brushes wear out and require renewal, the strips 45 may be readily removed from the bars, and new brushes wired or otherwise fastened in said pockets 46.

In Figs. 5 to 9 we have illustrated the bars as being straight, and while this construction has been found quite efficient in actual use, we may, in order to further increase their efficiency, form some or all of these bars with upward bends 61, as depicted in Figs. 10, 11, and 12, whereby a space 62 is formed in the grate. This construction possesses the advantage that it prevents to a great extent the stripping action of the lint from the picking fingers while passing through the grate, and an inspection of Fig. 12 will disclose the fact that the picking fingers 19 pass through the interstices between the bars 36 in line with the downwardly and rearwardly projecting rear-portion of the said grate, and that, therefore, the stripping action of the cotton lint from the picking spindles is minimized. We have ascertained that as the picking fingers 19 pass through the grate there is a tendency for some of the lint, when but loosely wound around the picking fingers, to be intercepted by the grate, but the lint will be prevented from dropping back into the bushes by the brushes. This loose lint will, however, be picked up by the next following spindles and carried backward to the stripper.

By reference to Fig. 2, it will be observed that the grate 35 is carried at its forward end above the rearwardly projecting end of the apron 125 which supports the member 37, Fig. 11, while the rear end of said grate is suspended by the member 38 from the lower angle-bars 68, 69, so that in case of breakage of any of the grate-bars; or when access is desired to the interior of the machine-body, said grate may be bodily removed from the channel.

In order that the cotton bushes may be depressed to prevent the branches, leaves and unripe bolls from passing into the space 62 in the grate, we secure to the lower side of the rear end-piece 38 a depressor, 63, Figs. 2, 5, 6, 10, and 12, which depressor is a transverse bar having its lower edges well rounded so as not to injure the plants, and it may be made from either metal, wood, or other suitable material, and attached to the end-piece 38 by screws 64 or other suitable and approved means.

As a further modification of the construction of the grate, we may reduce the thickness of the bars at their rear portion, as shown in Figs. 10 and 11, so that the spaces or interstices between the bars are wider at the rear portion of the grate than at the front portion, which will permit the ready passage of the picking fingers through the rear end of the grate without any danger of the lint thereon being stripped from said fingers in their passage through the grate. And as a still further modification of the bars we may form the forward part thereof of wood and the rear part of metal, as shown in Fig. 10, and fasten the bars in slots 136 in the forward part thereof by at least two rivets or other suitable fastening devices 137.

In Figs. 11 and 12 we have illustrated the grate as consisting of straight and bent bars, the bends being approximately at right angles. We may, however, form the bent portion into a curve, and in Fig. 11 we have shown in dotted lines such curved construction. The straight and curved bars may alternate, or one or more straight bars may be placed adjacent to each other in any manner which we shall find most advantageous and efficient to prevent limbs or twigs of the cotton bushes from getting into the space 62. We have also stated that the brushes 41 are fastened in pockets 46, but as a cheaper method of fastening them to the bars we may drill holes 137$^a$ into the bars as shown in Fig. 11 and fasten the brushes 41 therein in any suitable manner.

It is a well-established fact that the cotton lint adheres but lightly to the open bolls and that shaking or jarring of the bushes causes much of the lint to drop out of and from the bolls. It is, furthermore, well known that in order to successfully pick cotton by machinery and especially with revolving picking fingers the bushes should be gathered into as compact a space as can be reached by the picking fingers, and in order to accomplish these desirable results we provide at the forward end of the machine a gatherer comprising two very large and outwardly flaring wings 65 and 66, Figs. 1 and 2, the lower ends of which are brought close together to enable the lower branches of the cotton bushes being lifted up to pass into the machine but not so close as to prevent the stalks from entering the space 167 between them. These scoop-shaped wings 65 and 66 are removably secured to the forwardly inclined angle-bars 67 which bars are fastened to the lower longitudinal angle-bars 68 and 69, and the forwardly-inclined brace-bars 70, the latter bars being secured to the longitudinal bars as shown in the drawings. The rear edges of these scoop-shaped gatherers are approximately straight and nearly parallel to each other; their lower ends are inwardly turned so as to approach each other very closely and permit the stalks of the cotton plants only to pass, and they are then outwardly flared so as to project quite a distance beyond the side-walls of the machine, so-much-so as to fully embrace between them the tallest and widest bushes of the cotton plants, which in many cases reach a height of from four to seven feet and a width of over three feet. In existing machines the front gatherers permit the outermost portions of the branches of cotton plants to project beyond the gatherers which causes some of the branches to break. In gathering the branches into the space included between these gathering members these branches are also considerably shaken and jarred thereby causing considerable of the loose lint in the bolls and the branches to drop down upon the ground where the picking mechanism in unable to pick it up, thus requiring much additional hand labor to pick up this scattered lint, an objection which is almost entirely overcome in the introduction of our gatherers, which do not shake or jar the bushes but permit them to easily enter the picking channel in the machine without disturbing the lint.

48 and 49 designate a guard which is designed to serve as a shelving to underlie the lower branches of the bushes and to prevent any cotton lint from dropping onto the ground except that which may escape through the space between the two members of which the guard is composed. These two members are made in the form of pans and they are placed a suitable distance apart to afford a passage 50 between them for the stalks of the plants. The forward ends of these guard-members are pivoted to skirts 51 and 52 by hangers 53, Fig. 2, and pins or bolts 54. Their rear ends are movably fastened to the skirts by means of slotted irons 55 secured to the bottom and the sides of the guard-members and retained in position in the skirts, by bolts or other fastenings 56. By this slotted connection the rear ends of the guard-members are free to rise and fall a predetermined distance to compensate for any undulations in the field and to follow the same as the machine moves along the rows of plants. These guard-members are so located that the ends of the picking spindles 19 do not touch their bottom so that by the introduction of these pan-shaped guards we derive the double advantage of the picking spindles never coming in contact with the soil and of preventing any cotton lint from falling off the guard. This construction of the guards $i.$ $e.$ being pan-shaped and also movable vertically at their rear end, is a very decided improvement resulting a much closer gathering of the cotton lint and a better condition of the harvested cotton by being practically free from gritty matter, than has heretofore been accomplished. As a precaution that the bottoms of the guard-members may not come in contact with the picking spindles, should undulations in the ground or obstructions in the field cause the same to bend upwardly, we form in their bottoms longitudinal corrugations or depressions 130, as illustrated in Figs. 4 and 4ᵃ, for a distance which may be reached by the fingers.

In order that the pan-shaped guards may always follow the undulations of the ground, the entire machine-part of the harvester is arranged to be raised and lowered bodily by a hand-lever 73 mounted upon a shaft 74 Figs. 1 and 12, having its bearings 75 and 76 attached to the bridge-piece 12. Arms 77 and 78 are secured to this shaft 74 and connected with the body of the machine by rods 79 and 80 to lift the same, their lower ends engaging the upper angle-bars 71 and 72 as shown in Fig. 12, turnbuckles 81 and 82 being provided to permit proper adjustment of length of these rods. That the machine-body may be held at a fixed position without compelling the driver mounted upon the seat 122 located at the forward end of the vehicle to hold this lever 73 in his hand, there is provided a quadrant 83 having notches wherewith a catch 84 of usual construction engages and which catch may be disengaged from the notched quadrant by the hand-piece 85 and connecting-rod 86. It will now be observed that in order to cause the guards to be always near the ground they are free to rise and fall at their rear ends and also bodily with the machine.

To take up most of the weight of the body of the machine, we have provided spiral springs 87 and 88, which springs are mounted upon blocks 89 and 90. These blocks are placed upon studs 91 and 92 secured in the web of the bridge-piece 12 with one end and in a tie-plate 93 with their other ends on which there are nuts 94 for this purpose. The two outer ends of the springs are upwardly turned and that of the spring 88 formed into a hook 95 while the outer end of the spring 87 is formed into an eye 96, a tension-rod 97 having an eye 98 engaging the hook 95 and passing through the eye 96, being provided to tension the springs by the nut 98 on the screw-threaded end of said tensioning-rod 97. The two inner ends of the springs 87 and 88 are upwardly extended and formed into hooks 99 and 100, and rods 101 and 102 engage therewith with one end and with hooks 103 and 104 on the upper ends of the side-irons 13 and 14.

In operation the picking spindles are rotated by the pinions 20, that is to say, each column 18 has a longitudinal shaft 145 upon which said pinions are secured. These pinions revolve intermittently while the cylinder 15 rotates continually for the reason that the delay-gear 21 has gear-teeth 107 on a part of its periphery only, the toothed portion beginning with the teeth 109 in the inserted block 113, and ending with the tooth 108, approximately diametrically opposite the inserted block 113, the pinions 20 being prevented from revolving the remainder of their revolution around the delay-gear by blocks 105 on said pinions engaging with a smooth peripheral section 106 on said delay-gear. This delay-gear is loosely mounted upon the shaft 22 but to prevent it from turning and at the same time afford a slightly yielding resistance to its revolving, the web of the delay-gear is provided with a pocket 114 within which is located a spiral spring 115. On the guard-plate 24 Figs. 21 and 22 there is located a similar pocket 117 which forms an abutment for the spiral spring 115, and since the guard-plate 24 is fastened to the upper angle-bar 71 and the lower angle-bar 68, this delay-gear cannot revolve with the cylinder 15 but is permitted to yield slightly whenever any undue strain is brought to bear upon said delay-gear. This is particularly the case when the pinions 20 reach the beginning 109 of the toothed segment where they strike with their cogs the first tooth 109 with considerable force, and frequent breakage of this, and often several succeeding teeth is the result. In order to avoid this breakage as much as possible and to provide for ready means for repairing or replacing a broken tooth on the gear-section, we form therein at the beginning of the tooth-section an opening 110, leaving, however, a bridge 112, in said opening and locate in this opening a block 113, of a width corresponding with a multiple of the pitch-distance of the cogs, this width being in the present instance that of two pitch-distances so as to include two full teeth and two half-spaces. This block 113 has on both of its ends gear-teeth 116, and it is secured in the opening 110 and to the bridge 112 by a bolt 144, which bolt is located exactly in the middle of said block so that by reversing the block 113 the teeth of the respective end thereof will coincide with those in the gear-section and form, as it were, an integral part thereof. The introduction of this removable and reversible tooth-section into the delay-gear has resulted in reducing the cost of repairs and the delay in the time of making the same to a minimum.

Upon the shaft 22 and outside of the cam-plate 23 there is securely keyed a gear-wheel 150, wherewith engages one of a train of intermediate gears 151, Fig. 12, that connects the gear-wheel 150 with a driven gear 157 upon a shaft 152, Figs. 2 and 12, to rotate a beater-star 124, while the gear-wheel 154 of the train of gears, secured to a shaft 130

153 rotates a stripper 123, fastened to said shaft 153, so that when the picking spindles 19 reach the stripper, the cotton lint on said spindles is removed therefrom by said stripper, while the beater-star removes the same from the stripper and discharges the lint rearwardly over a downwardly inclined apron 155 into a basket, not shown, placed upon the rear-platform 126. This train of intermediate gear-wheels is preferably located on the outside of the machine. It is shown in Fig. 12 in dotted lines only, for the reason that this mechanism is old and forms no part of this present invention.

In Figs. 13, 14, and 15, we have shown one of the cylinder heads 16 and 17 in detail. These heads are circular disks having in their periphery semicircular notches 118 covered by semicircularly-notched caps 119 to form bearings for the trunnions on the columns 18, screws 120 being employed to keep the caps in position. In the disks there are openings 121 to facilitate tapping of the holes in the rim of the disk for the screws 120.

We have heretofore described with some degree of minuteness the construction of the delay-gear and the mechanism by means of which the picking of the cotton is accomplished in order that the operation of the same may be thoroughly understood, but we lay no claim to the specific details of construction of the delay-gear for the reason that these specific elements and combinations of the delay-gear are the sole invention of one of the present applicants and that an application for patent on the same has been filed by the inventor concurrent with this present application.

We have heretofore stated that the guard-members 48 and 49 are pan-shaped so as to retain therein any lint that may have dropped into the same, but in order that branches of the cotton bushes which, as the machine is moving over the row of cotton plants may lie close to the bottom thereof, be lifted out of the same, we have placed into these pans at their rear end lifting-bars 128, Figs. 2 and 4, which are fastened to the bottom of the pans and rise rearwardly to the upper edge 129 of the rear walls of said pans which lifting-bars will carry the branches over the rear wall and prevent them from sweeping any cotton lint out of the same that may have gathered therein.

We now call particular attention to the fact that by the introduction of the scoop-shaped gatherer at the front end of the machine, the peculiar construction of the pan-shaped guards, the grate and the depressor following the grate, we have accomplished results in collecting the bulk of that portion of the cotton lint, that has previously been scattered thus minimizing if not entirely avoiding all waste of the cotton lint between the time that the bushes enter the machine and pass out of the same, results that have not heretofore been accomplished by any other cotton harvester that has been placed into actual use in the cotton fields.

Having thus fully described our invention, we claim as new and desire to secure to us by Letters Patent of the United States—

1. In a cotton harvester, the combination, of rotating picking spindles; means for operating the same, and an pan-shaped guard pivoted to the machine at its forward end, and free to rise and fall at its rear end.

2. In a cotton harvester, the combination, of rotating picking spindles; means for operating the same, and a guard comprising two oppositely-located, pan-shaped members each being pivoted to the machine at its forward end and free to rise and fall at its rear end.

3. A cotton picking machine including picking fingers moving in vertical planes parallel with the movement of the machine, and shelving below said picking fingers and sufficiently close to the ground to underlie branches of cotton plants, said shelving being pan-shaped to afford a receptacle for the cotton lint that drops off the cotton bushes before the picking fingers can remove the same from said bushes, there being corrugations in said shelving parallel with the line of movement of said picking fingers within which the free ends of said picking fingers are adapted to be received and prevented from reaching the ground over which the machine is moving.

4. A cotton picking machine including picking fingers moving in vertical planes parallel with the movement of the machine, and two shelves below said picking fingers and sufficiently close to the ground to underlie branches of cotton plants, said shelves being supported on opposite sides of the machine and sufficiently separated to permit entry of the stalks or trunks of cotton plants between them said shelves being pan-shaped to afford receptacles for the cotton lint that drops off the cotton bushes before the picking fingers can remove the same from said bushes, there being corrugations in said pans parallel with the movement of said picking fingers within which the free ends of said picking fingers are adapted to be received and prevented from reaching the ground over which the machine is moving.

5. A cotton harvester, including picking spindles moving in planes parallel with the movement of the machine; means for operating said picking fingers, and a guard below said picking fingers, said guard being pivoted to the forward end of the machine and free to rise and fall at its rear end, there being longitudinal corrugations in the bottom of said guard within which the free ends of said picking fingers are adapted to be received.

6. A cotton harvester, including picking fingers moving in planes parallel with the movement of the machine; means for operating said fingers, and a guard below said picking fingers, said guard comprising two oppositely-located members attached to the forward end of the machine and free to rise and fall at their rear ends, there being longitudinal corrugations in the bottom of each of the two members within which the free ends of said picking fingers are adapted to be received.

7. In a cotton harvester, the combination, of a machine-body, there being a channel below said machine-body in which cotton plant portions are adapted to be received; cotton picking mechanism in said machine-body including rotating picking spindles; means for operating the same, and a pan-shaped guard below said picking fingers, there being means in said guard for lifting the branches of the cotton bushes over the rear wall of said guard, and longitudinal depressions adapted to receive the free ends of said picking fingers said channel including four walls of which said guard forms the lowermost one.

8. In a cotton harvester, the combination, of a machine-body, there being a channel below said machine-body in which cotton plant portions are adapted to be received; cotton picking mechanism in said machine-body including rotating picking spindles moving in vertical planes parallel with the movement of the machine; means for operating said picking spindles, and a guard below the said picking spindles, said guard comprising two pan-shaped members supported on opposite sides of the machine and separated sufficiently to permit the entry of the stalks or trunks of cotton plants between them, there being means in said members for lifting the branches of the cotton plants over the rear wall of said members said channel including four walls of which said guard forms the lowermost one.

9. In a cotton harvester, the combination, of rotating picking spindles; means for operating the same, and a guard below said picking spindles, said guard being pan-shaped and pivoted at its forward end to the machine and free to rise and fall at its rear end, there being means in said guard for lifting the branches of the cotton bushes over the rear wall of said guard.

10. In a cotton harvester, the combination, of rotating picking spindles; means for operating the same, and a guard, said guard consisting of two oppositely-located shelves below said picking spindles and spaced a sufficient distance apart to permit of the entry of the stalks or trunks of cotton plants between them, each member of said guard being pan-shaped and pivoted to the forward end of the machine, there being means in said members for lifting the branches of cotton plants over the rear wall of said members.

11. In a cotton harvester, the combination, of rotating picking spindles; means for operating the same, and a guard, said guard being located below said picking spindles and pivoted to the machine at its forward end, and free to rise and fall at its rear end, said guard being pan-shaped, there being means in said guard for lifting the branches of cotton bushes over the rear wall thereof.

12. In a cotton harvester, the combination, of rotating picking spindles; means for operating the same; and a guard, below said picking spindles, said guard comprising two oppositely-located members spaced a sufficient distance apart to permit of the entry of the stalks or trunks of cotton plants between them, each member of said guard being pan-shaped and pivoted to the forward end of the machine and free to rise and fall independently of the other at the rear end, there being means in each of said pan-shaped members for lifting branches of the cotton plants over the rear wall of said members.

13. In a cotton harvester, the combination, of picking spindles moving in vertical planes parallel with the movement of the machine, means for operating the same, and a guard located below said picking spindles, said guard being pan-shaped, there being longitudinal corrugations in the bottom of said guard parallel with the line of movement of said picking fingers, and means for lifting branches of cotton plants over the rear wall of said guard.

14. In a cotton harvester, the combination, of picking spindles moving in vertical planes parallel with the movement of the machine; means for operating said picking spindles, and a guard below said picking spindles, said guard comprising two members spaced a sufficient distance apart to permit of the entry of the stalks or trunks of cotton plants between them, said members being pan-shaped there being longitudinal corrugations in the bottom of each member parallel with the line of movement of said spindles, there being means in each of said guard-members for lifting branches of the cotton bushes over the rear wall of said members.

15. In a cotton harvester, the combination, of picking spindles moving in vertical planes parallel with the movement of the machine; means for operating the same, and a guard below said picking spindles, said guard being formed in the shape of a pan, there being longitudinal grooves in the bottom of said guard running parallel with, and located opposite said picking fingers and adapted to receive the free ends of said picking spindles, whereby the latter are prevented from reaching the ground over which the machine is moving, and means in said guard for lifting branches of the cotton bushes over the rear wall thereof.

16. In a cotton harvester, the combination, of picking spindles moving in vertical planes parallel with the movement of the machine; means for operating the same, and a guard, said guard comprising two oppositely-located members, each of which is formed in the shape of a pan, and located below the picking spindles, there being longitudinal grooves in the bottom of each member of said guard running parallel with the line of movement of said fingers and located opposite of the same and adapted to receive the free ends of said spindles, there being means in said members for lifting branches of cotton bushes over the rear wall of said guard-members.

17. In a cotton harvester, the combination, of picking spindles; means for rotating the same, and a guard below said picking spindles, said guard being pan-shaped and pivoted to the forward end of the machine and free to rise and fall at its rear end, there being longitudinal grooves in the bottom of said pan opposite the picking spindles and adapted to receive the free ends thereof, there being means in said guard for lifting branches of cotton bushes over the rear wall of said guard.

18. In a cotton harvester, the combination, of picking spindles; means for rotating the same, and a guard located below said picking spindles, said guard comprising two oppositely-located members, said members being pan-shaped, each of said members being pivoted to the forward end of the machine and free to rise and fall at its rear end, there being longitudinal grooves in each member of said guard, and means for lifting branches of cotton plants over the rear wall of said pan-shaped member.

19. A cotton picking machine including a channel within which cotton plant portions may be received, and cotton picking mechanism adapted to extend substantially across said channel and comprising picking fingers moving in vertical planes parallel with the movement of the machine and adapted to pick cotton from the plant portions interposed between the walls of said channel, the wall of the channel adjacent to the bases of the picking fingers consisting of a series of separate bars spaced sufficiently far apart to permit the passage of said picking fingers through the spaces between said bars, and end pieces, said bars being removably attached to said end pieces, and said entire grate bodily removable from said channel, a portion of said bars being bent at approximately right angles, the wall opposite the bases of said fingers being located sufficiently close to the ground to underlie branches of cotton plants while said picking fingers are removing cotton from said plants that are interposed between the walls of said channel.

20. In a cotton harvester, the combination, of picking spindles; means for operating the same; a channel into which said picking spindles enter to pick cotton from the plants interposed between the walls of said channel, the wall adjacent to the bases of said spindles comprising straight and bent bars spaced a sufficient distance apart to permit the fingers to pass through the spaces between said bars.

21. In a cotton harvester, the combination, of picking spindles; means for operating the same; a channel into which said picking spindles enter to pick cotton from the plant portions interposed between the walls of said channel, the wall adjacent to the bases of the picking spindles being constructed of straight and bent bars, the bends being approximately at right angles.

22. A cotton picking machine including picking spindles moving in vertical planes parallel with the movement of the machine; a channel into which said picking spindles enter to pick cotton from the plant portions interposed between the walls of said channel, the wall adjacent to the bases of the picking spindles consisting of bars spaced a sufficient distance apart to permit of the picking spindles entering said channel through the spaces between the bars, said bars being bent, there being brushes on that portion of said bars where the picking spindles are withdrawn from said channel.

23. A cotton picking machine including picking spindles moving in vertical planes parallel with the movement of the machine; a channel into which said picking spindles enter to pick cotton from the plant portions interposed between the walls of said channel, the wall adjacent to the bases of the picking spindles consisting of bars spaced a sufficient distance apart to permit of the picking spindles entering said channel through the spaces between said bars, said bars being bent, the bends being approximately at right angles, there being brushes on that portion of said bars where the picking spindles are withdrawn from said channel.

24. In a cotton harvester the combination, of picking spindles; means for operating the same; a channel into which said picking spindles enter to pick cotton from plant portions interposed between the walls of said channel and from which these spindles are withdrawn, and a grate forming that wall of said channel through which said picking spindles pass, said grate being formed of straight and bent bars, there being brushes on that end of said bars where the picking spindles are withdrawn from said channel.

25. In a cotton harvester, the combination, of picking spindles; means for operating the same; a channel into which said spindles enter to pick cotton from plant portions interposed between the walls of said channel and from which they are withdrawn, and a grate forming that wall of said channel through which said picking spindles pass, said grate being formed of straight and bent bars, the bends being approximately at right angles, there being brushes on that portion of said bars where the picking spindles are withdrawn from said channel.

26. A cotton picking machine including a channel within which cotton plant portions may be received, cotton picking mechanism including picking spindles moving in vertical planes parallel with the movement of the machine and adapted to extend substantially across said channel to pick cotton from the plant portions interposed between the walls of said channel, the wall of the channel adjacent to the bases of the picking spindles consisting of a series of bars spaced a sufficient distance apart to permit the picking spindles to enter the channel and to withdraw therefrom, and end pieces, said bars being bent and removably affixed to said end pieces, the entire grate bodily removable from said channel, there being brushes on that portion of said bars where the picking spindles are withdrawn from said channel.

27. A cotton picking machine including a channel within which cotton plant portions may be received, cotton picking mechanism including picking spindles moving in vertical planes parallel with the movement of the machine and adapted to extend substantially across said channel to pick cotton from the plant portions interposed between the walls of said channel, the wall of the channel adjacent to the bases of the picking spindles consisting of a series of bars spaced a sufficient distance apart to permit the picking spindles to enter the channel and to withdraw therefrom, and end pieces, said bars being removably affixed to said end pieces, the entire grate bodily removable from said channel, there being brushes on that portion of said bars where the picking spindles are withdrawn from said channel.

28. A cotton picking machine including a channel within which cotton plant portions may be received; cotton picking mechanism including picking spindles moving in vertical planes parallel with the movement of the machine and adapted to extend substantially across said channel to pick cotton from the plant portions interposed between the walls of said channel, the wall of said channel adjacent to the bases of the picking spindles consisting of a series of bars spaced a sufficient distance apart to permit the picking spindles to enter the channel and to withdraw therefrom, and end pieces, said bars being bent and removably affixed to said end pieces, the bends being approximately at right angles, the entire grate bodily removable from said channel, there being brushes on that portion of said bars where the picking spindles are withdrawn from said channel.

29. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking fingers pass, said grate being formed of bars and end pieces, the bars being removable from said end pieces, said grate comprising straight and bent bars, there being brushes on that portion of said bars where the picking spindles are withdrawn from said channel.

30. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of bars and end pieces, the bars being removably affixed to said end pieces, said grate comprising straight and bent bars, the bends being approximately at right angles, there being brushes on that portion of said bars where the picking spindles are withdrawn from said channel.

31. In a cotton harvester, the combination, of picking spindles; means for operating the same; a channel into which said picking fingers enter and from which they are withdrawn to pick cotton from cotton plant portions admitted to said channel, and a grate forming that wall of said channel through which said picking spindles pass, said grate comprising bars having their rear portion reduced in thickness to increase the space between the bars where the picking spindles are withdrawn from the same, said grate comprising straight and bent bars, the bends being at their reduced portion.

32. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising bars having their rear portion reduced in thickness to increase the space between the bars where the picking spindles are withdrawn from the same, said grate comprising straight and bent bars, the bends being at the reduced portion and approximately at right angles.

33. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising bars having their rear portion reduced in thickness to increase the space between the bars at that portion of the grate where the picking spindles are withdrawn from the same, said grate being formed of straight and bent bars, the bends being at the reduced portion, and brushes in the spaces between the rear portion of the bars.

34. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising bars having their rear portion reduced in thickness to increase the space between the bars where the picking spindles are withdrawn therefrom, said grate being formed of straight and bent bars, the bends being at approximately right angles at the reduced portion of said bars, there being brushes in the spaces between the bars at their rear portion.

35. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising bars each consisting of a front portion and a reduced rear portion, the front portion being removably attached to the rear portion.

36. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking fingers pass, said grate comprising bars each consisting of a front and a reduced rear portion, the front portion being removably attached to the rear portion and bent at the reduced portion.

37. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking fingers pass, said grate comprising bars each consisting of a front portion and a reduced rear portion, the front portion being removable from the reduced rear portion and bent at approximately right angles at the rear portion.

38. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking fingers pass, said grate comprising bars each consisting of a front portion and a reduced rear portion, the front portion being removable from the rear portion, the grate having straight and bent bars.

39. In a cotton harvester, the combination, of picking spindles; means for operating the same, a channel into which said picking spindles enter and from which they are withdrawn to pick cotton from cotton plant portions admitted to said channel, and a grate forming that wall of said channel through which said picking fingers pass, said grate comprising bars each consisting of a front portion and a reduced rear portion, the front portion being removable from the rear portion, the grate having straight and bent bars, the bends being approximately at right angles.

40. In a cotton harvester, the combination, of picking spindles; means for operating the same; a channel into which said picking fingers enter and from which they are withdrawn to pick cotton from cotton plant portions admitted to said channel, and a grate forming that wall of said channel through which said picking spindles pass, said grate comprising bars each consisting of a front portion and a reduced rear portion, there being brushes in the spaces between the bars at the rear portion thereof, the front portion being removable from the rear portion of said bars.

41. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising bars consisting of a front portion and a reduced rear portion, the front portion being removable from the rear portion, said rear portion being bent, there being brushes in the spaces between the bars at their rear portion.

42. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising bars each consisting of a front portion and a reduced rear portion, the front portion being removable from the reduced rear portion and the latter bent, there being brushes in the interstices between the rear portion of the bars.

43. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising bars each consisting of a front portion and a reduced rear portion, the front portion being removable from the rear portion and the latter bent at approximately right angles, there being brushes in the spaces between the rear portion of said bars.

44. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising bars each consisting of a front portion and a reduced rear portion, the front portion being removable from the rear portion, the grate being formed of straight and bent bars, there being brushes in the spaces between the rear portion of said bars.

45. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising bars each consisting of a front portion and a reduced rear portion, the front portion being removable from the rear portion, the grate being formed of straight and bent bars, the latter being bent at approximately right angles, there being brushes in the spaces between the bars at their reduced portion.

46. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of separate bars, end pieces to which the bars are removably attached, said bars comprising a front portion and a reduced rear portion removably attached to the front portion.

47. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of separate bars, end pieces to which the bars are removably attached, said bars comprising a front portion and a reduced rear portion, the front portion being removably attached to the rear portion, there being bends in the reduced portion of said bars.

48. In a cotton harvester, the combination, of picking spindles; means for operating the same; a channel into which said picking spindles enter and from which they are withdrawn to pick cotton from cotton plant portions admitted to said channel; and a grate forming that wall of said channel through which said picking spindles pass, said grate being formed of separate bars, end pieces to which said bars are removably affixed, said bars comprising a front portion and a reduced rear portion, the front portion being removably attached to the reduced portion, there being approximately right angled bends in the reduced portion.

49. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of separate bars, end pieces to which said bars are removably attached, said bars comprising a front portion and a reduced rear portion, the front portion being removably attached to the rear portion, there being straight and bent bars in said grate.

50. In a cotton harvester, the combination of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of separate bars, end pieces to which the bars are removably attached, said bars comprising a front portion and a reduced rear portion, the front portion being removably attached to the rear portion, there being straight bars and bent bars in said grate, the bends being at approximately right angles.

51. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of separate bars, end pieces to which said bars are removably attached, said bars comprising a front portion and a reduced rear portion, the front portion being removably attached to the reduced portion, there being brushes in the spaces between the reduced portion of said bars.

52. In a cotton harvester, the combination, of picking spindles; means for operating the same, a channel into which said picking spindles enter and from which they are withdrawn to pick cotton from cotton plant portions admitted to said channel, and a grate forming that wall of said channel through which said picking spindles pass, said grate being formed of separate bars, end pieces to which the bars are removably attached, said bars comprising a front portion and a reduced rear portion, said front portion being removable from the rear portion, there being bends in the rear portion and brushes in the spaces between the rear portion of said bars.

53. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass; said grate being formed of separate bars, end pieces to which said bars are removably attached, said bars comprising a front portion and a reduced rear portion, the front portion being removable from the rear portion, there being right angled bends in the rear portion and brushes in the spaces between the rear portion of said bars.

54. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of separate bars, end pieces to which said bars are removably attached, said bars comprising a front portion and a reduced rear portion, the front portion being removable from the rear portion, there being straight bars and bent bars in said grate and brushes in the spaces between the reduced portion of said bars.

55. In a cotton harvester, the combination, of picking spindles; means for operating the same; and a channel into which said picking spindles enter and from which they are withdrawn to pick cotton from cotton plant portions admitted to said channel, and a grate forming that wall of said channel through which said picking spindles pass, said grate being formed of separate bars, end pieces to which said bars are removably attached, said bars comprising a front portion and a reduced rear portion, the front portion being removable from the rear portion, the grate including straight and bent bars, the bends being approximately at right angles, there being brushes in the spaces between the rear portion of said bars.

56. In a cotton harvester, the combination, of picking spindles; means for operating the same; a channel into which said picking spindles enter and from which they are withdrawn to pick cotton from cotton plants admitted to said channel, and a grate forming that wall of said channel through which said picking spindles pass, said grate comprising separate bars, members on that portion of said bars where the picking spindles are withdrawn from said grate, pockets in said members, and brushes in said pockets, there being straight and bent bars in said grate.

57. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate comprising separate bars, members on that portion of said bars where the picking fingers are withdrawn from said grate, pockets in said members, and brushes in said pockets; there being straight and bent bars in said grate, the bends being approximately at right angles.

58. In a cotton harvester, the combination, of picking spindles; means for operating the same; a channel into which said picking spindles enter and from which they are withdrawn to pick cotton from cotton plant portions admitted to said channel, and a grate forming that wall of said channel through which the picking spindles pass, said grate being formed of bars having their rear portion reduced in thickness to increase the space between the bars at that portion of said bars where the picking spindles are withdrawn from said grate, members on the reduced portion of said bars, pockets in said members, and brushes in said pockets, there being straight and bent bars in said grate.

59. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of bars having their rear ends reduced in thickness to increase the space between the bars at that portion of said bars where the picking spindles are withdrawn, members on the reduced portion of said bars, pockets in said members, and brushes in said pockets, there being straight and bent bars in said grate the bends being substantially at right angles.

60. In a cotton harvester, the combination, of picking spindles; means for operating them; a channel into which said picking spindles enter and from which they are withdrawn to pick cotton from cotton plant portions admitted to said channel, and a grate forming that wall of said channel through which said picking spindles pass, said grate being formed of bars each comprising a front portion and a reduced rear portion to increase the space between the bars at that portion of said bars where the picking spindles are withdrawn from said grate, the front portion of said bars being removably attached to the rear portion, members on the reduced portion of said bars, pockets in said members, and brushes in said pockets.

61. In a cotton harvester, the combination, of picking spindles; means for operating the same; a channel within which the picking spindles enter and from which they are withdrawn to pick cotton from cotton plant portions admitted to said channel, and a grate forming that wall of said channel through which said picking spindles pass, said grate being formed of bars each comprising a front portion and a reduced rear portion to increase the space between the bars at that portion thereof where the picking spindles are withdrawn from said grate, the front portion of said bars being removable from the rear portion, members on the reduced portion of said bars, pockets in said members, and brushes in said pockets, said bars having their reduced portion bent at approximately right angles.

62. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of bars each consisting of a front portion and a reduced rear portion, members on the reduced portion of said bars, pockets in said members, and brushes in said pockets, there being straight and bent bars in said grate.

63. In a cotton harvester, the combination, of picking spindles; means for operating the same; a channel into which said picking spindles enter and from which they are withdrawn to pick cotton from cotton plant portions admitted to said channel, and a grate forming that wall of said channel through which said picking spindles pass, said grate being formed of bars each comprising a front portion and a reduced rear portion, members on the reduced portion of said bars, pockets in said members, and brushes in said pockets, there being straight bars in said grate and bars having right angled bends.

64. In a cotton harvester, the combination, with picking spindles, of means for operating the same, a channel in the machine wherein the cotton plants are gathered while the picking spindles are operating to extract the cotton from the plants; a grate through which the picking spindles pass while operating, and a depressor in the rear of the grate, said depressor consisting of a transverse bar attached to the rear end of said grate whereby the branches of the cotton plants are forwardly depressed and prevented from reaching the rear end of said grate.

65. In a cotton harvester, the combination, with picking spindles, of means for operating the same; a channel in the machine wherein the cotton plants are gathered while the picking spindles are operating to extract the cotton from the plants; a grate through which the picking spindles pass while operating, and a depressor in the rear of said grate and attached thereto, whereby the branches are prevented from reaching the rear end of said grate.

66. In a cotton harvester, the combination, with picking spindles, of means for operating the same; a channel in the machine wherein the cotton plants are gathered while the picking spindles are operating; a grate through which the picking spindles pass, and a depressor at the rear end of said grate, said grate having bent bars as described, whereby a space is formed below said bars at their rear end and in front of said depressor.

67. In a cotton harvester, the combination, with picking spindles, of means for operating the same; a channel in the machine wherein the cotton plants are gathered while the picking spindles are operating; a grate through which the picking spindles pass; a depressor at the rear end of said grate and attached thereto, said grate consisting of straight and bent bars.

68. In a cotton harvester, the combination, of picking spindles; means for rotating the same, and a guard pivoted to the machine at its forward end and free to rise and fall at its rear end.

In testimony that we claim the foregoing as our invention we have hereunto set our hands in the presence of two subscribing witnesses.

HENRY E. BULLOCK.
RUDOLPH C. SCHERLING.

Attest:
MICHAEL J. STARK,
JAMES J. TYNAN.

Copies of this patent may be obtained for five cents each, by addressing the "Commissioner of Patents, Washington, D. C."